Sept. 8, 1942.  H. W. PLEISTER  2,295,127
METHOD OF AND BLANK FOR MANUFACTURING BOLT ANCHORS
Original Filed July 10, 1941  4 Sheets-Sheet 1
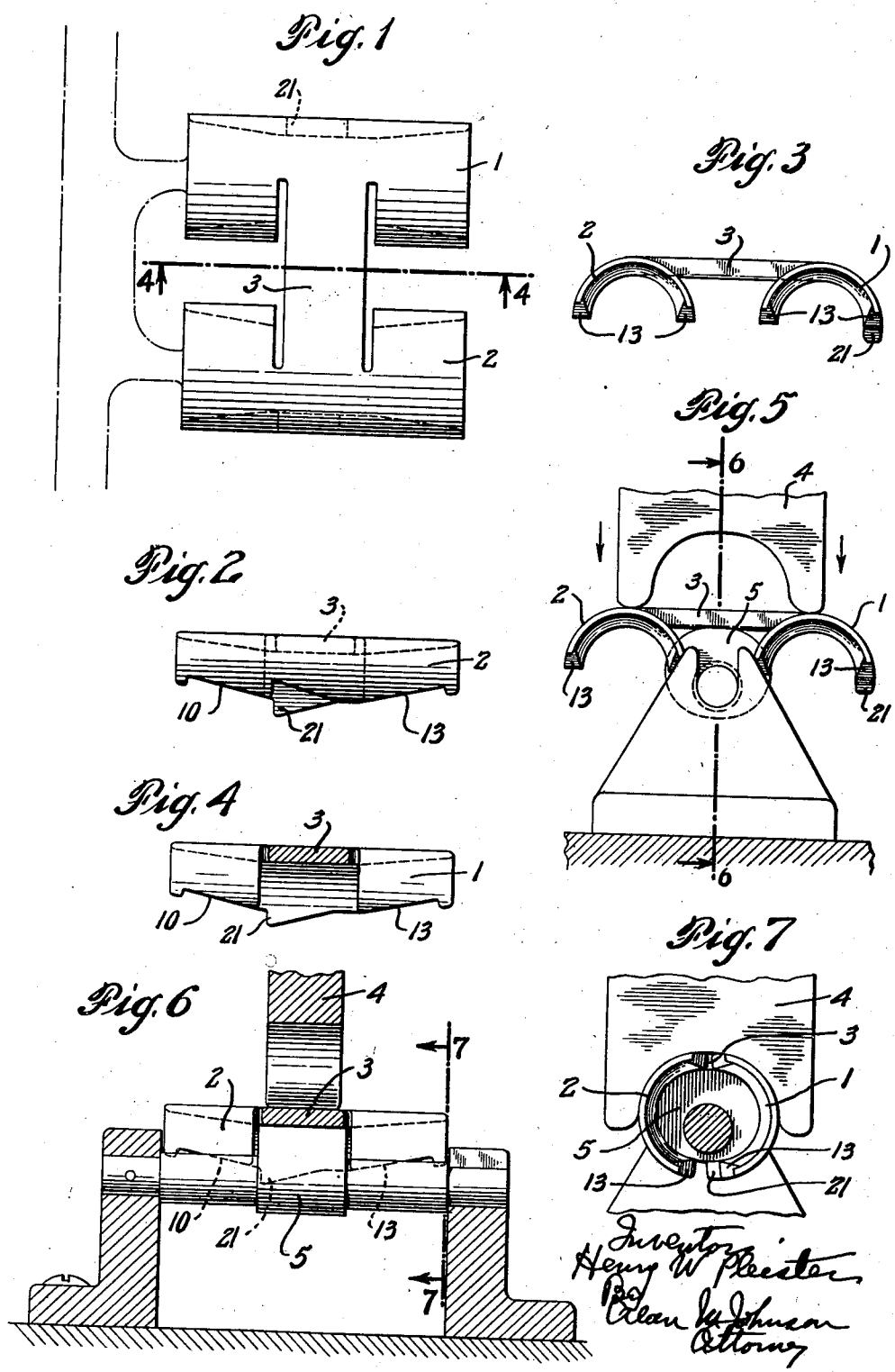

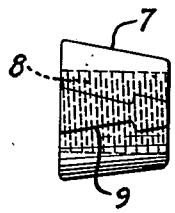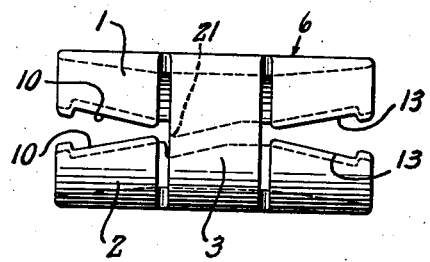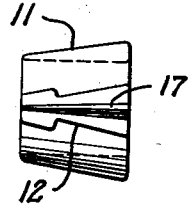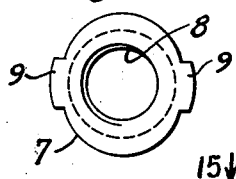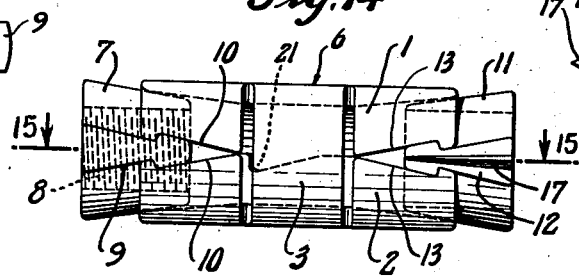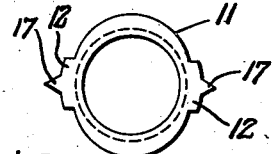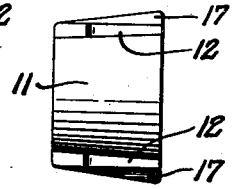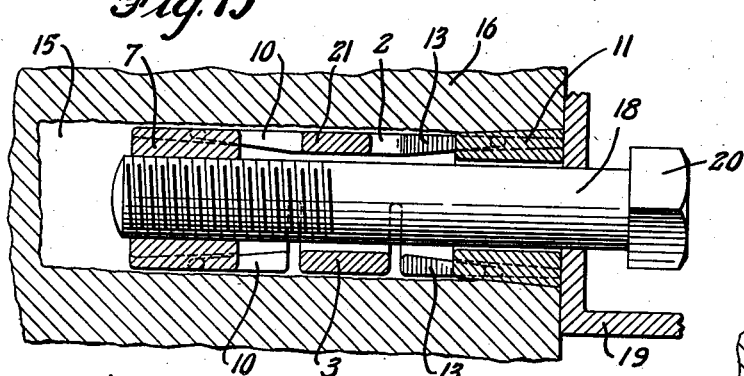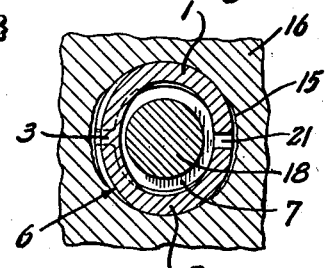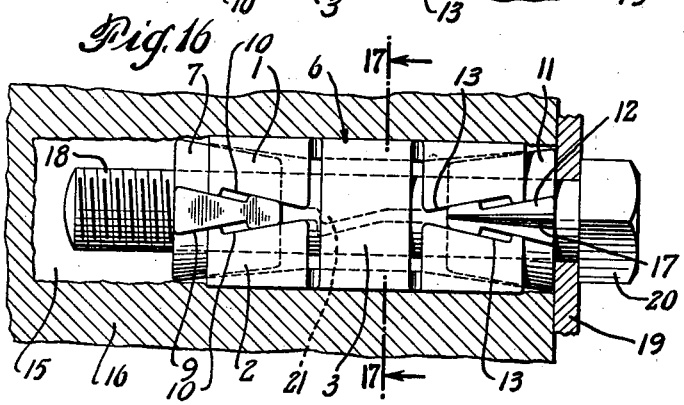

Sept. 8, 1942. H. W. PLEISTER 2,295,127
METHOD OF AND BLANK FOR MANUFACTURING BOLT ANCHORS
Original Filed July 10, 1941 4 Sheets-Sheet 4

Inventor
Henry W Pleister
By
Alan M Johnson
Attorney

Patented Sept. 8, 1942

2,295,127

UNITED STATES PATENT OFFICE 2,295,127

METHOD OF AND BLANK FOR MANUFACTURING BOLT ANCHORS

Henry W. Pleister, Westfield, N. J., assignor to Diamond Expansion Bolt Company, Inc., Garwood, N. J., a corporation of New Jersey Original application July 10, 1941, Serial No. 401,777, now Patent No. 2,267,420, dated December 23, 1941. Divided and this application July 11, 1941, Serial No. 401,971

5 Claims. (Cl. 29—148)

My invention relates to the method of manufacturing bolt anchors, and also to an article in the form of a cast blank, from which my bolt anchor is made.

In a companion application Ser. No. 401,777, filed July 10, 1941, patented December 23, 1941, No. 2,267,420, I have described and claimed the new finished bolt anchor. This application is in effect a divisional application of S. N. 401,777.

More particularly my invention is an improvement on the invention covered by my U. S. Patent 1,549,327, granted August 11, 1925.

The improvements over this former patent will more fully appear in the specification and claims of this application.

My present invention relates to certain methods, steps of manufacture, and article, which will be more fully hereinafter described and pointed out in the claims.

Fig. 1 is a plan view of the casting from which I preferably form the shield for my bolt anchor. The dotted lines indicate the gate for the mold;

Fig. 2 is a rear elevation of one of the integral shield sections which is provided with a stop to cooperate with one of the stops carried by the screw threaded conical nut, to prevent further relative movement between the shield and nut. The other stop on the nut cooperates with the integral web or neck which also acts as a stop;

Fig. 3 is a perspective view of the casting from which the bolt anchor shield is preferably made;

Fig. 4 is a cross-section on lines 4—4 of Fig. 1 looking in the direction of arrows;

Fig. 5 is a side elevation of one form of press for shaping the casting, which is shown mounted on the round anvil of the press, about to be shaped;

Fig. 6 is a transverse section on line 6—6 of Fig. 5 looking in the direction of the arrows;

Fig. 7 is a sectional view on line 7—7 of Fig. 6 looking in the direction of the arrows, showing the two integral sections of the shield bent towards each other, ready to receive the cooperating non-circular threaded cone nut and the non-circular unthreaded cone sleeve;

Fig. 8 is a plan view of the integral shield bent sufficiently to receive the conical non-circular threaded nut and the non-circular unthreaded conical sleeve;

Fig. 9 is a plan view of the non-circular screw-threaded cone nut about to be assembled in the shield, Fig. 8;

Fig. 11 is a plan view of the non-circular unthreaded cone sleeve about to be assembled in the shield, Fig. 8;

Fig. 10 is an end elevation of the non-circular screw-threaded cone nut, Fig. 9;

Fig. 12 is an end elevation of the non-circular unthreaded cone sleeve;

Fig. 13 is a side elevation of the unthreaded cone sleeve;

Fig. 14 is a plan view of the complete integral shield with its cooperating conical screw-threaded nut, Fig. 9, and its conical unthreaded sleeve, Fig. 11, locked in position by further bending the two sections 1 and 2 towards each other;

Fig. 15 is a vertical section through a wall, or other-support, illustrating my bolt anchor about to be expanded by a machine bolt to support the work on the wall;

Fig. 16 is a horizontal section showing my bolt anchor expanded;

Fig. 17 is a cross-section on line 17—17 of Fig. 16, looking in the direction of the arrows;

Fig. 18 is a side elevation of the casting after being bent in any suitable manner to bring the two integral shield sections opposite each other;

Fig. 19 is a vertical section through a wall or other support, showing my single expansion machine bolt anchor about to be expanded by a machine bolt;

Fig. 20 is a vertical section, similar to Fig. 19, showing the position of the parts at maximum expansion, and the integral web or neck acting as a stop for the expanding lug on the screw-threaded nut.

Figure 18:
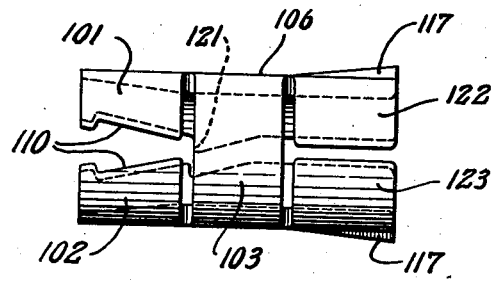
Figs. 18, 19 and 20, illustrate a modification in which my invention is applied to what is known in the art as a single expansion machine bolt anchor.

Prior to my present invention, and in my prior patent previously referred to, the shield sections are held together by two spring rings for handling, shipping, and insertion within a hole usually drilled in masonry, stone, concrete, brick, or similar material.

In double expansion machine bolt anchors these spring rings allow the shield to expand too easily; so easily in fact that if the bolt anchor is inserted in the wall and the threaded nut, or the forward end of the shield should contact with the sides of a misdrilled hole, the shield will begin to expand automatically, while in the process of insertion. This makes it impossible to insert the bolt anchor all the way in the hole. The bolt anchor must then be taken out and worked in some other way. This may be done by drilling a hole a little larger, or by turning a machine bolt into the nut and driving the bolt anchor further into the hole by tapping the head of the bolt with a hammer. Often this cannot be successfully done, leading to the loss of time and increasing the expense of installation.

It is quite desirable that the shield sections should expand very easily before they make frictional contact with the inner surface of the hole. The reason for this is, that if they do not expand easily, the friction of the thread on the machine bolt, cooperating with the thread on the nut, will cause the shield sections to rotate in the hole and no expansion will occur.

This free expansion, however, has its serious drawbacks. If on inserting the expanding shield sections in the hole in the wall, the hole should be slightly tight or its surfaces rough, parts of the bolt anchor, particularly the inner nut, will be impeded in the act of insertion and the shield sections will be expanded before the head of the bolt anchor is fully inserted in the hole. When this occurs no amount of hammering will improve the situation, because the more hammering that was done on the collar or outer end of the bolt anchor, greater would be the expansion of the shield sections inside the hole. They would lock or bind so as to make it impossible for the bolt anchor to be fully seated in the hole.

In order to overcome this objection, I have provided a rigid connection between the two shield sections to lessen the number of parts to be manufactured and assembled, to increase the rigidity of the bolt anchor for transportation and handling, and yet not to such a degree that the bolt anchor cannot be readily expanded in the hole when expansion is desired. This rigid connection between the two parts of the shield sections also prevents accidental separation of the separate parts of the bolt anchor, and cheapens the cost of manufacture.

It is true, that any projection on the shield sections, or on the nut, would prevent the rotation of the bolt anchor in the hole, but, at the same time, such a projection would cause the shield sections to bind when inserting them in the hole, leading to premature expansion and preventing the bolt anchor from being completely inserted in the hole.

To overcome the objections previously referred to, I preferably connect the shield sections by a comparatively rigid and short integral web or neck located preferably midway between their ends, to insure a balanced parallel expansion of the bolt anchor. The web or neck should not be of such length as to cause all the expansion to occur on the free sides of the shield sections, as this would give an unbalanced expansion at one side of the shield, and one which might separate the free sides of the shield sections to a degree where the stop on the nut, to be hereinafter described, would escape contact with its cooperating stop on the shield section.

The first step in my invention is to form a casting of any suitable metal, such as malleable iron, or any other suitable material, in which the two shield sections 1 and 2 and the integral connecting web or neck 3 are cast at the same time, the web or neck 3 being cast in a straight horizontal line, with the two semi-cylindrical shield sections 1 and 2 cast parallel to each other and substantially at right angles to the straight horizontal web or neck 3, so that both shield sections 1 and 2 and the integral web or neck 3 may be drawn from the sand in the flask without the use of cores.

The casting, Fig. 3, is then bent in any suitable manner as by a press. A simple form of press which may be used is one having a hammer 4, and a curved anvil 5, Fig. 5. The casting is located in the press with the integral web or neck 3 resting upon the curved anvil 5. By applying pressure to the hammer in the direction of the arrows, Fig. 5, the two sections 1 and 2 of the bolt anchor shield 6 are bent towards each other, the integral web or neck 3 being bent into a semi-circle, Figs. 7, 8 and 14, by the press, so that it will conform to the uniform diameter of the shield 6.

This first bending or forming of the casting is preliminary to permit the shield 6 to receive and hold the expanding members, which are the screw-threaded conical nut 7, provided with the internal screw-threads 8, and the two inclined or wedge lugs 9—9, which are mounted between the meeting edges 10—10 of the shield sections 1 and 2; and also to receive the other expanding member, the unthreaded conical sleeve 11 with its inclined or wedge lugs 12—12, which are mounted between the meeting edges 13—13 of the two shield sections 1 and 2.

After the threaded cone nut 7 and the unthreaded cone sleeve 11 are located in their proper positions, the integral shield sections 1 and 2 are subjected to further pressure, Fig. 14, to lock the cone nut 7 and cone sleeve 11 in the shield sections, thereby forming the complete double expansion machine bolt anchor.

The integral web or neck 3 is sufficiently rigid to firmly hold the conical nut 7 and conical sleeve 11 to the shield sections and prevent accidental disengagement in handling and transportation, and also prevent accidental or premature expansion of the shield sections 1 and 2 when inserted in a hole 15 in a wall or other support 16, Fig. 15.

This integral web or neck 3 also avoids the use of two springs to hold the sections together and the necessity of casting grooves for the springs. It is, however, sufficiently flexible to bend slightly when the expansion is created, and to permit the shield sections to be forced apart uniformly so that the dividing space between each will be approximately the same on the right and left side of the complete shield 6.

Both the conical nut 7 and the conical sleeve 11 are non-circular in cross sections, being preferably elliptical in cross section, Figs. 10, 12 and 17.

On the expanding lugs 12—12, on the unthreaded sleeve 11, I preferably cast inclined thin integral ribs 17—17, one on each lug 12. These ribs 17—17 being placed on the top of the lugs 12—12 will permit their free passage between the meeting surfaces 13—13 of the shield sections 1 and 2.

The ribs 17—17 are preferably used to overcome, by engaging with the surface of the hole, the drag or friction of the screw-threads on the machine bolt 18 which, if sufficient, would cause the bolt anchor to rotate in the hole 15 without being expanded.

If necessary to seat the bolt anchor within the hole, the sleeve 11 may be given one or more blows by a hammer, the ribs 17—17 being sufficiently thin to collapse before the sleeve 11 would be distorted or the bolt anchor expanded. Obviously, should one or more of these ribs 17—17 be placed on the screw-threaded nut 7, or on either one of the shield sections 1 and 2, or the integral neck or web 3, they would cause a premature expansion of the bolt anchor, and defeat one of the advantages of my invention.

In operation, the bolt anchor 6, Fig. 14, is placed within hole 15 in a wall or other support 16. The machine bolt 18 is then passed through a hole in the work 19, through the unthreaded conical sleeve 11 and engages with the female threads in the conical nut 7, Fig. 15. By screwing up on the head 20 of the machine bolt the expanding lugs 9—9 cooperating with the inclined surfaces 10—10 on the two shield sections 1 and 2 will cause the expansion of the shield adjacent to the nut, and also at the same time the portion of the shield 6 in contact with the unthreaded sleeve 11, by causing the inclined surfaces 13—13 of the shield sections 1 and 2 to ride up, more or less, the expanding lugs 12—12 on the unthreaded sleeve 11, all as well known in the art, forming what is known as a double expansion machine bolt anchor.

I also provide the meeting surfaces 10—10 of the shield sections 1 and 2 with a stop, 21, Fig. 8, to cooperate with the head of the expanding lug 9 on the threaded nut 7, to prevent further or excessive loads on the expansion bolt, pulling the bolt 18, with the nut 7 and sleeve 11 from the shield 6, with the consequent damage to property, or possible loss of life. The need for and the action of, such stops are fully described in my Patent 1,549,327, previously referred to.

In my present invention, my nut stop 21 is located on the open, unconnected, or free meeting surfaces, and not on the meeting surfaces which are connected by the neck or web 3, Figs. 8 and 16. On the meeting surfaces connected by the web or neck 3, this web or neck itself forms a stop. This is shown more clearly in Fig. 20, where the lug 109, which acts the same as lug 9, is brought up hard against the neck or web 103, which acts the same as neck 3.

Figure 19:
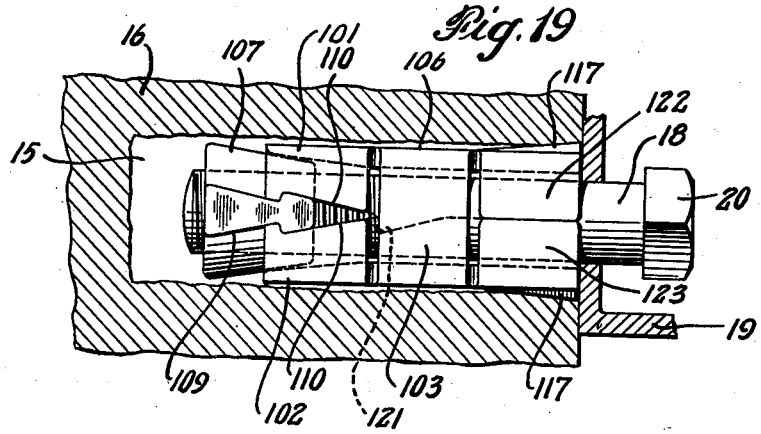
Figure 20:
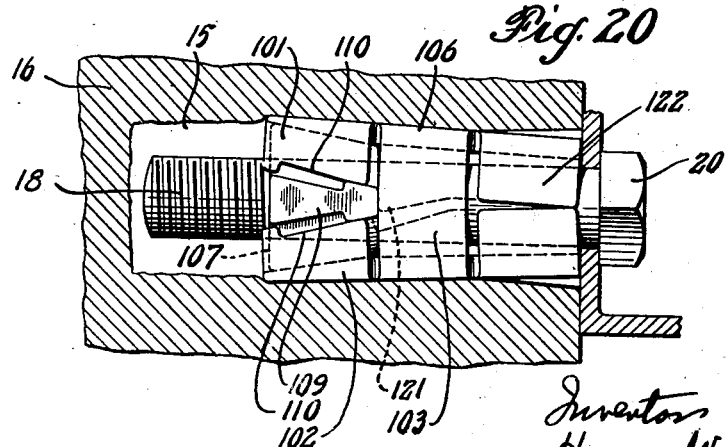

In Figs. 18, 19 and 20, I have illustrated my invention applied to what is known in the art as a single machine-type expansion bolt. To avoid confusion with the double expansion type, which is illustrated in the other figures, I have used similar but different designating numerals.

In this form, there is no movable unthreaded sleeve, the expansion being mainly at the inner end and performed by the machine bolt 18 engaging with the threads of the nut 107, provided with the expanding lugs 109—109.

In this form, the shield sections 101 and 102 and the connecting web or neck 103 are cast, as in the other form, and bent in a press exactly the same as in the first form described. A preliminary bending permits the insertion of the screw-threaded nut 107. The final bending locks the nut 107 to the shield 106. In this form, the shield section 101 is provided with cast wings 122, and the section 102 is provided with cast wings 123, both of which are bent in the press to form semi-cylindrical portions as shown in Figs. 18-20. The shield section 101 is provided with inclined surfaces 110, and a stop 121. The shield section 102 is also provided with inclined surfaces 110, but not with a stop for the integral web or neck 103 acts as a stop on the side of the shield 106, opposite the stop 121, see Fig. 20. The operation of this form is similar to that of the other form, except, of course, it is a single expansion and not a double expansion.

In the single expansion bolt anchor 106, where no sleeve is employed, the ribs 117 may be placed on one or both of the wings 122 and 123.

I may use a different method of bending the cast blank than that illustrated in Figs. 5, 6 and 7.

Figure 21:
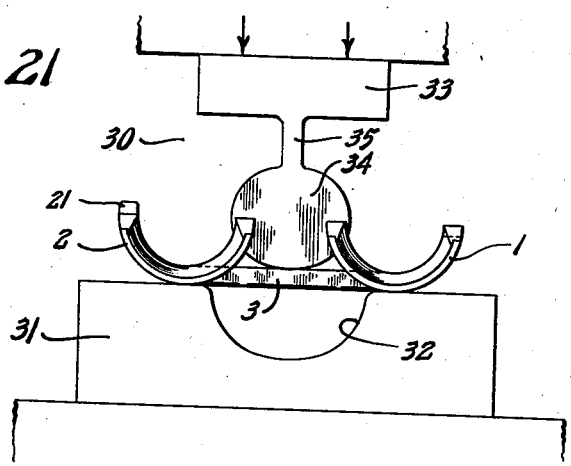
Fig. 21 is a front elevation of a different form of press, showing the blank about to be bent.
Figure 22:
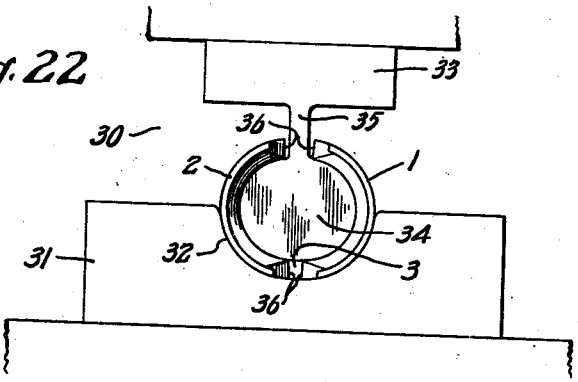
Fig. 22 is a front elevation of the press of Fig. 21, showing the blank after receiving its preliminary bending.

For example, I may employ a punch or bending press 30, Figs. 21 and 22, in which the fixed anvil 31 is provided with a semi-cylindrical depression 32. The hammer or movable portion 33 is provided with a cylindrical forming head 34, connected to the movable member 33 of the press by a shank 35.

The cast blank is put in the press with its web or neck 3 straddling the cylindrical depression 32 in the anvil 31, Fig. 21. By moving the hammer 33 downward in the direction of the arrows, Fig. 21, pressure will be exerted on the web 3, which will be forced into the cylindrical depression 32 in the anvil 31 and caused to conform, more or less, to its interior surface.

At the same time, the shield sections 1 and 2 will be caused to swing in arcs to approach, but preferably not to contact with, the shank 35, Fig. 22. This serves to leave the meeting edges 36, 36 sufficiently far apart to permit the insertion of the cone nut 7 with its expanding lug 9, and the sleeve 11 with its expanding lug 12, into the shield 6 and into position to cooperate with their inclined surfaces 10, 10 and 13, 13 respectively.

The shield 6, after being shaped, as shown in Figs. 21 and 22, is slipped off the cylindrical member 34, by a longitudinal movement, and is ready to receive its cooperating cone nut 7 and its unthreaded sleeve 11.

Figure 23:
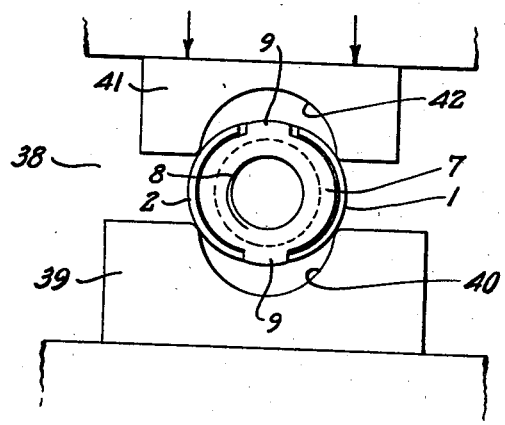
Fig. 23 is a front elevation of the finishing press and blank.

After these members are located in the shield 6, the entire double expansion machine bolt anchor is taken to another press, 38, Fig. 23.

This press has a fixed anvil 39, provided with a semi-cylindrical recess 40 and a movable hammer 41, with a semi-cylindrical recess 42. It is clear that as the bolt anchor, Fig. 23, has not received its final forming pressure, it will be elliptical in cross-section, as shown in Fig. 23. By moving the movable hammer 41 towards the anvil 39, the shield sections 1 and 2 will be made into a true cylindrical bolt anchor by forcing the meeting edges 36, 36, towards each other, which, at the same time, locks the cone nut 7 and the sleeve 11 firmly to the shield 6, and prevents accidental disengagement in transportation, handling, and in placing it in situ. It will be noted that the neck or web 3 thereby becomes a portion of the cylindrical shield and conforms to its cylindrical contour.

Having thus described this invention in connection with illustrative embodiments thereof, to the detail of which I do not desire to be limited except as by the terms of my claims, what is claimed as new and what is desired to secure by Letters Patent is set forth in the appended claims.

What I claim is:

1. The method of making a bolt anchor shield, having a plurality of parts, consisting in casting said parts and a connecting web or neck at the same time, then bending the sections towards each other, and bending the web or neck to form an open approximate cylindrical shield, the web or neck being adapted to form an integral portion of the cylindrical surface of the complete bolt anchor shield.

2. The method of making a bolt anchor shield, having a plurality of integral sections, consisting in casting a horizontal web or neck and two parallel semi-cylindrical integral shield sections at substantially right angles to the horizontal web or neck at the same time, then bending the sections towards each other, and bending the web or neck to form an open approximate cylindrical shield, inserting expanding means in the open approximate cylindrical shield, and then subjecting the shield to further bending strains to form a substantially perfect cylinder to hold the expanding means within the cylinder against accidental disengagement in handling, transportation, and premature expansion in situ, the integral web or neck forming an integral portion of the cylindrical surface of the bolt anchor shield.

3. The method of making an expansible shield from cast metal, for a double expansion machine type expansion bolt anchor, consisting in casting the double expansible shield in a plurality of cast metal parts, connected together by an integral web or neck, cast at the same time as the parts of the shield and of the same material, bending the web or neck to bring the shield sections adjacent to each other, inserting a screw-threaded nut in one end of the shield, and an unthreaded sleeve in the other end of the shield, then further bending the neck or web to hold the nut and sleeve within the shield to form a cylindrical shield, the integral web or neck forming an integral portion of the cylindrical surface of the shield.

4. A new article of manufacture comprising an integral cast blank, having two semi-cylindrical shield sections connected by an integral cast web or neck, the web or neck being cast in a straight horizontal line and the two shield sections being cast parallel to each other and at right angles to the integral web or neck, so that both the shield sections and the integral web or neck may be drawn from the sand in a flask without the use of cores, the blank on being bent forming a cylindrical shield for a bolt anchor, and the integral web or neck adapted to become an integral portion of the cylindrical surface of the shield.

5. A new article of manufacture comprising a blank from which a cylindrical shield for a machine type expansion bolt is adapted to be formed, consisting of a straight horizontal neck or web, connecting two parallel integral semi-cylindrical shield sections, one at each end of the horizontal neck or web and both at substantially right angles to it, the blank being adapted to be bent to form a cylindrical shield in which the horizontal neck or web conforms to, and becomes a part of the cylindrical surface of the shield.

HENRY W. PLEISTER.